United States Patent
Kole (10) Patent No.: US 8,354,920 B2
(45) Date of Patent: Jan. 15, 2013

(54) VEHICLE OVERHEAD CLEARANCE DETECTION SYSTEM AND METHOD OF OPERATION

(76) Inventor: John Kole, Longmeadow, MA (US)

( * ) Notice: Subject to any disclaimer, the term of this patent is extended or adjusted under 35 U.S.C. 154(b) by 489 days.

(21) Appl. No.: 12/692,143

(22) Filed: Jan. 22, 2010

(65) Prior Publication Data

US 2011/0181407 A1 Jul. 28, 2011

(51) Int. Cl.
*B60Q 1/00* (2006.01)
*B60T 7/16* (2006.01)
*G01B 11/26* (2006.01)

(52) U.S. Cl. ........ 340/435; 340/436; 340/901; 180/167; 356/141.1

(58) Field of Classification Search .................. 340/435, 340/958
See application file for complete search history.

(56) References Cited

U.S. PATENT DOCUMENTS

| | | | |
|---|---|---|---|
| 3,716,833 A | 2/1973 | Roth | |
| 4,284,971 A | 8/1981 | Lowry et al. | |
| 4,477,184 A | 10/1984 | Endo | |
| 5,389,912 A | 2/1995 | Arvin | |
| 6,268,803 B1 | 7/2001 | Gunderson et al. | |
| 6,411,054 B1 | 6/2002 | Van Wiemeersch | |
| 7,259,660 B2 * | 8/2007 | Ewerhart et al. | 340/436 |
| 7,449,996 B2 | 11/2008 | Hill | |
| 2007/0103282 A1 | 5/2007 | Caird et al. | |
| 2009/0315693 A1 | 12/2009 | Nugent | |

FOREIGN PATENT DOCUMENTS

| | | |
|---|---|---|
| KR | 19970037872 | 7/1997 |
| KR | 20020034368 | 5/2001 |

OTHER PUBLICATIONS

International Search Report mailed Sep. 26, 2011 for International Application No. PCT/US2011/021126 filed Jan. 13, 2011.
Written Opinion of the International Searching Authority mailed Sep. 26, 2011 for International Application No. PCT/US2011/021126 filed Jan. 13, 2011.
Linearizing Sharp Ranger Data, Acroname Robotics, http://www.acroname.com/robotics/info/articles/irlinear/irlinear.html, accessed Jan. 25, 2010.
Sensors—Sharp IR Range Finder, Society of Robots, http://www.societyofrobots.com/sensors_sharpirrange.shtml, accessed Jan. 25, 2010.
Sharp IR and sunlight, Society of Robots, http://www.societyofrobots.com/robotforum/index.php?topic=5812.0, accessed Jan. 25, 2010.
Sharp IR Rangers Information, Acroname Robotics, http://www.acroname.com/robotics/info/articles/sharp/sharp.html, accessed Jan. 25, 2010.

* cited by examiner

*Primary Examiner* — Donnie Crosland
(74) *Attorney, Agent, or Firm* — Cantor Colburn LLP (57) ABSTRACT

An overhead clearance detection system and method of operation are provided. The system includes a sensor for measuring a distance to an object. A vertical height for the object is determined and compared to a user defined clearance height. If the object's vertical height is less than the user defined clearance height, an alarm is sounded. In one embodiment, the system is removably mountable to a vehicle windshield.

22 Claims, 12 Drawing Sheets

VEHICLE OVERHEAD CLEARANCE DETECTION SYSTEM AND METHOD OF OPERATION

BACKGROUND OF THE INVENTION

The subject matter disclosed herein relates to a system for detecting objects that pose a threat of collision, and in particular to a system that is mountable within a vehicle for detecting objects that may collide with cargo mounted to the roof of the vehicle, with high trailers towed behind the vehicle, or with high portions of the vehicle itself.

Vehicles are often equipped with racks and mounting devices to allow the operator to transport cargo on the roof of the vehicle or to tow cargo behind the vehicle. This cargo may include items that may not be conveniently arranged within the vehicle, such as a bicycle for example. The cargo often extends the vertical height of the vehicle, increasing the risk for collision between the cargo and low clearance objects such as garage doors and awnings for example. It should be appreciated that a collision between the cargo and an object may damage the cargo, the object, the vehicle or all three.

There have been several proposed solutions to assist the vehicle operator in remembering that the cargo is mounted to the vehicle roof. These include reminder type devices, such as a tag that attaches to the vehicle's rear view mirror or dashboard. This technique attempts to minimize the risk of collision by the presence of the reminder device in the operator's field of vision. Unfortunately, this technique is passive and is least effective when the driver is tired or distracted, which corresponds with the times when collisions with low clearance objects are most likely.

Electronic systems have also been proposed. These systems utilize sensors mounted to the high point on the cargo or on the outside of the vehicle. When an obstacle is detected, an alarm is emitted within the vehicle compartment. While more effective than the reminder techniques, these electronic systems require the operator either to install a wired connection between the inside and the outside of the vehicle, or to create some form of wireless connection, both of which complicate the installation of the device. Further, for sensors that mount to the cargo, the sensor must be installed and removed each time cargo is mounted to or removed from the vehicle. Still other systems have been proposed that utilize a radar-based sensor on the outside of the vehicle for detecting objects. While some of these systems do not have to be remounted when the cargo changes, if the roof-rack configuration changes, the system needs to be recalibrated. Further, another drawback is that these systems are installed on the exterior of the vehicle and therefore must be able to withstand the weather, making the devices more costly.

While existing overhead clearance detection systems are suitable for their intended purposes, there remains a need for improvements, particularly in providing an overhead clearance detection system where the detection height may be changed and the system may be easily mounted and operated within a vehicle compartment.

BRIEF DESCRIPTION OF THE INVENTION

According to one aspect of the invention, an overhead clearance detection system for a vehicle having a windshield is provided. The overhead clearance detection system includes a first sensor having a transmitter for emitting a first signal through the windshield and a receiver. A controller is electrically coupled to the first sensor, the controller having a processor responsive to executable instructions when executed on the processor for determining vertical distance in response to the receiver detecting the first signal and comparing the vertical distance to a predetermined threshold.

According to another aspect of the invention, an overhead clearance detection system for a vehicle having a windshield is provided having a housing. An infrared optical sensor coupled to the housing and arranged to emit an optical signal substantially perpendicular to the windshield. A controller is arranged in the housing, the controller being coupled to receive a signal from the infrared optical sensor, wherein the controller has a processor responsive to executable computer instructions when executed on the processor for determining a vertical distance in response to a first signal from the infrared optical sensor.

According to yet another aspect of the invention, a method of operating an overhead clearance detection system in a vehicle having a windshield is provided. The method includes the steps of determining a height threshold. A signal is emitted and received. A vertical height is determined from the signal. The vertical height is compared to the height threshold. An audible alarm is emitted when the vertical height is less than or equal to the height threshold.

According to yet another aspect of the invention, an overhead clearance detection system for a vehicle having a windshield is provided. The overhead clearance detection system includes at least one arm. A coupler is arranged on one end of the at least one arm, the coupler attaching the at least one arm to the inside of the windshield. A first distance sensor is operably coupled to rotate relative to the at least one arm, the first distance sensor having a transmitter for emitting a first signal and a receiver for detecting a reflection of the first signal. The first distance sensor has a first operating range. A controller is electrically coupled to the first distance sensor, the controller having a processor responsive to executable instructions when executed on the processor for determining vertical distance in response to the receiver detecting the reflection of the first signal.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

An exemplary embodiment of an overhead clearance detection system 20 is illustrated in FIGS. 1-6. As will be discussed in more detail below, the overhead clearance detection system 20 provides advantages in determining if an object in the path of a vehicle is lower than a desired clearance height. The overhead clearance detection system 20 may also provide additional advantages of being easily and removably installable in an operator's vehicle. The overhead clearance detection system 20 may also provide for a user definable clearance height. Finally, the overhead clearance detection system 20 may provide audio alarms, visual alarms or both when a potential collision is detected.

The overhead clearance detection system 20 includes a housing 22. The housing 22 has a user input device 24 and a display 26, which in the exemplary embodiment are arranged on a front side 30. In the exemplary embodiment, the user input device 24 may be a momentary button. The user input device 24 may also be a toggle switch, a slider switch, a dial, or a combination thereof, for example. As will be discussed in more detail below, the user input device 24 operates in a state-dependent manner to provide different functionality depending on the operational state of the overhead clearance detection system 20. The user input device 24 allows the operator to turn the overhead clearance detection system 20 on and off, set the desired clearance height and silence an activated alarm for example. In the exemplary embodiment, the display 26 is a two-digit, 7-segment light emitting diode (LED) display. The display 26 may also be a liquid crystal display (LCD) or an organic light emitting diode (OLED) display for example.

Figure 1:
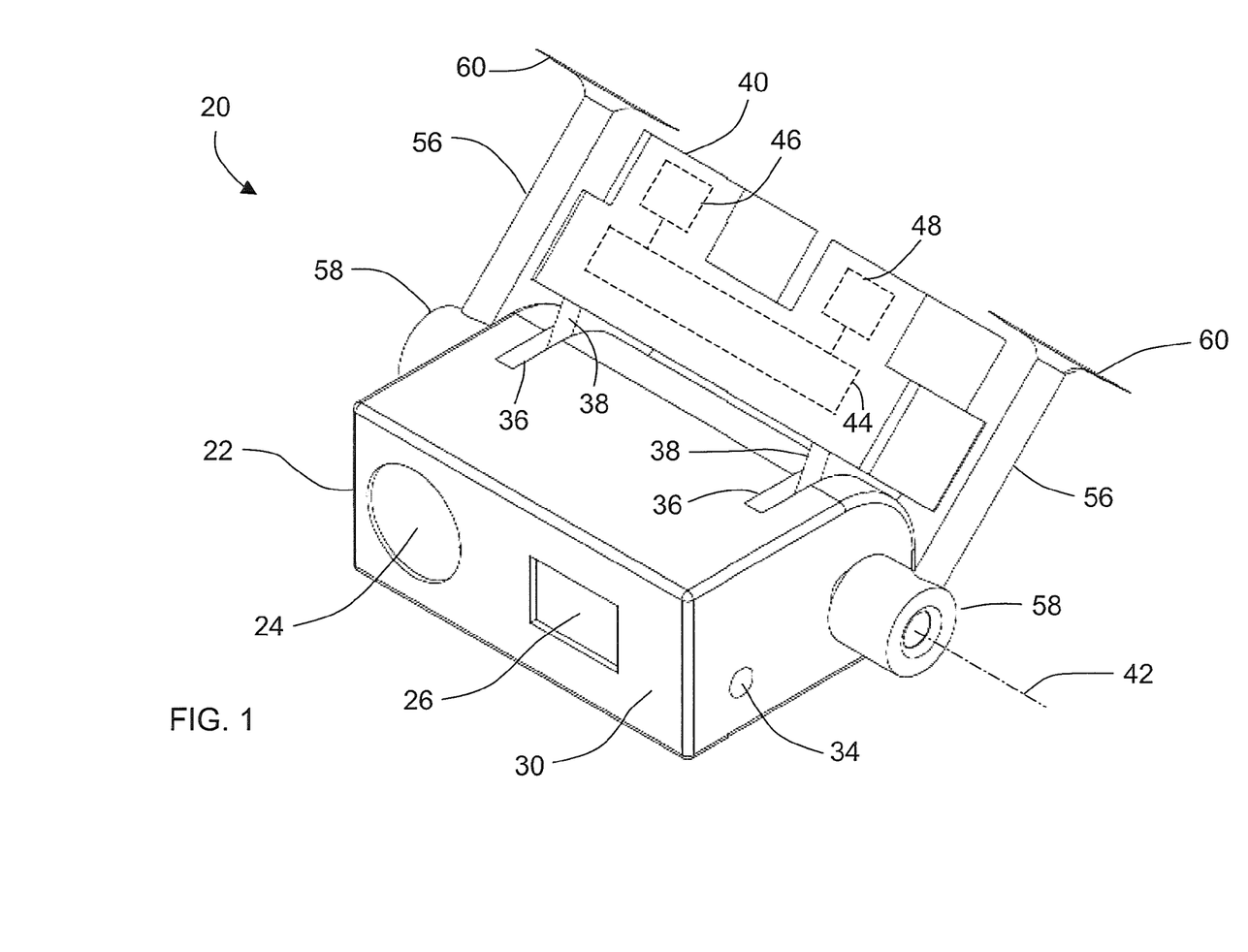
FIG. 1 is a perspective view illustration of an overhead clearance detection system in accordance with an embodiment of the invention.
Figure 2:
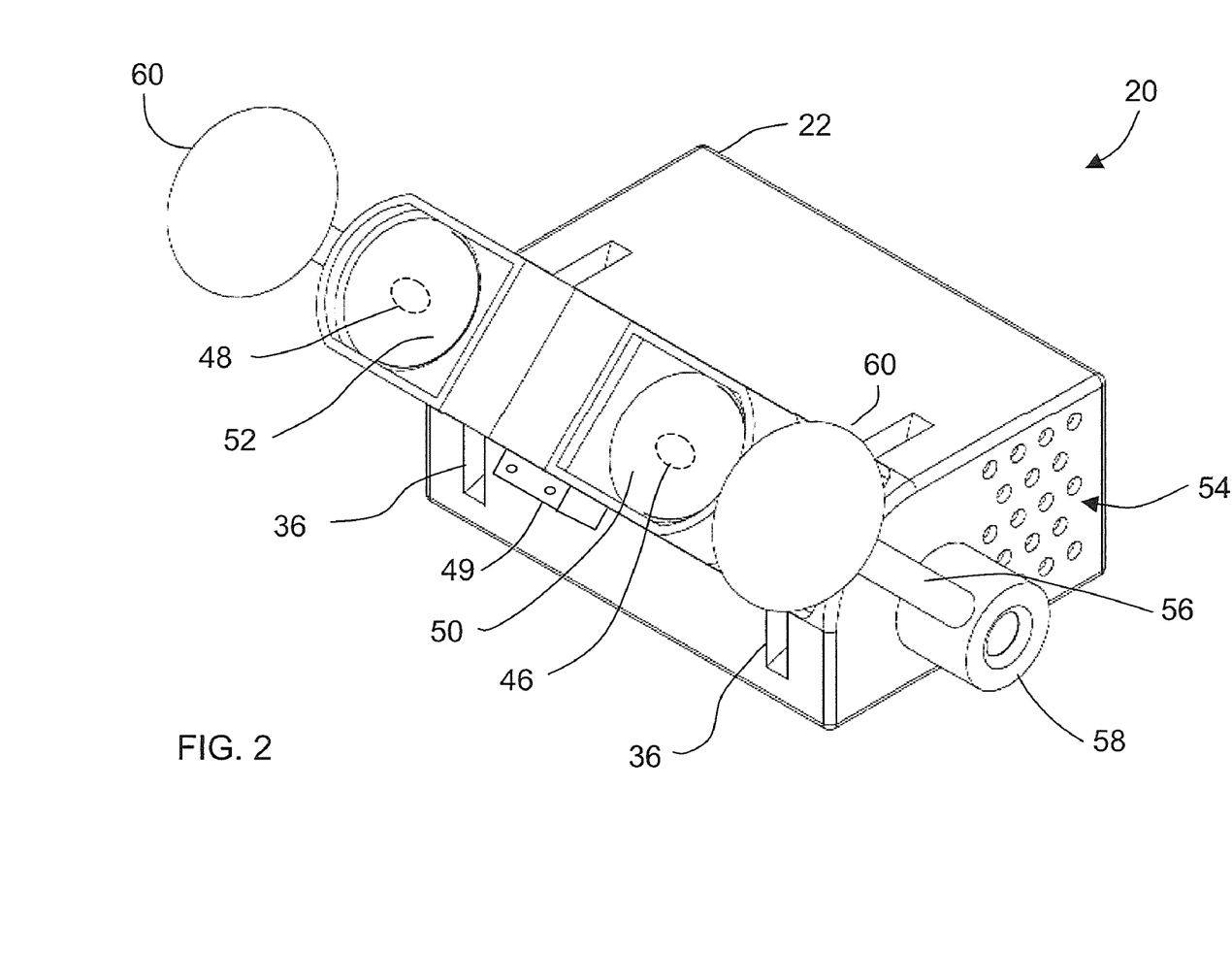
FIG. 2 is another perspective view illustration of the overhead clearance detection system of FIG. 1.
Figure 3:
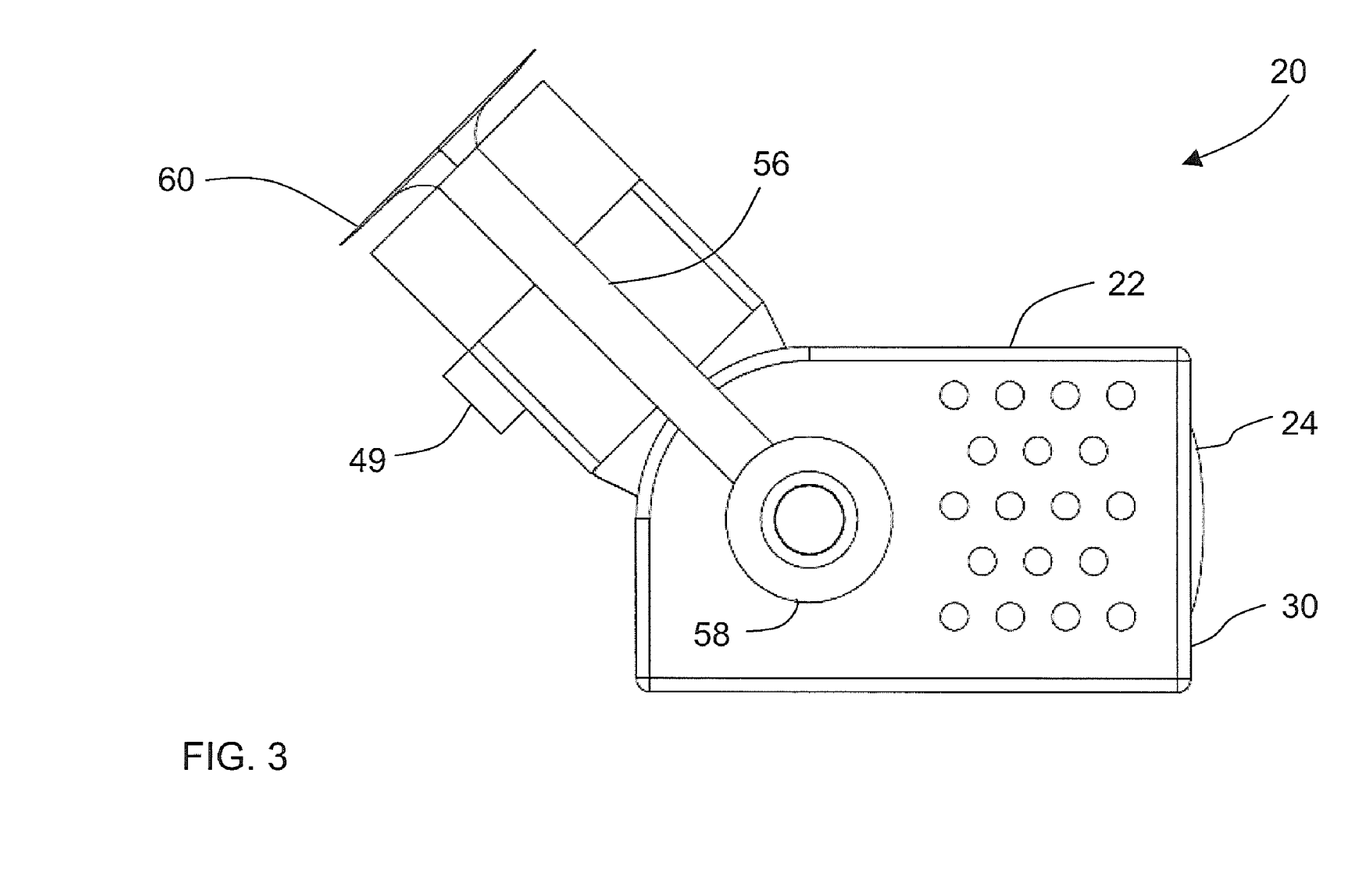
FIG. 3 is a side plan view illustration of the overhead clearance detection system of FIG. 1.
Figure 4:
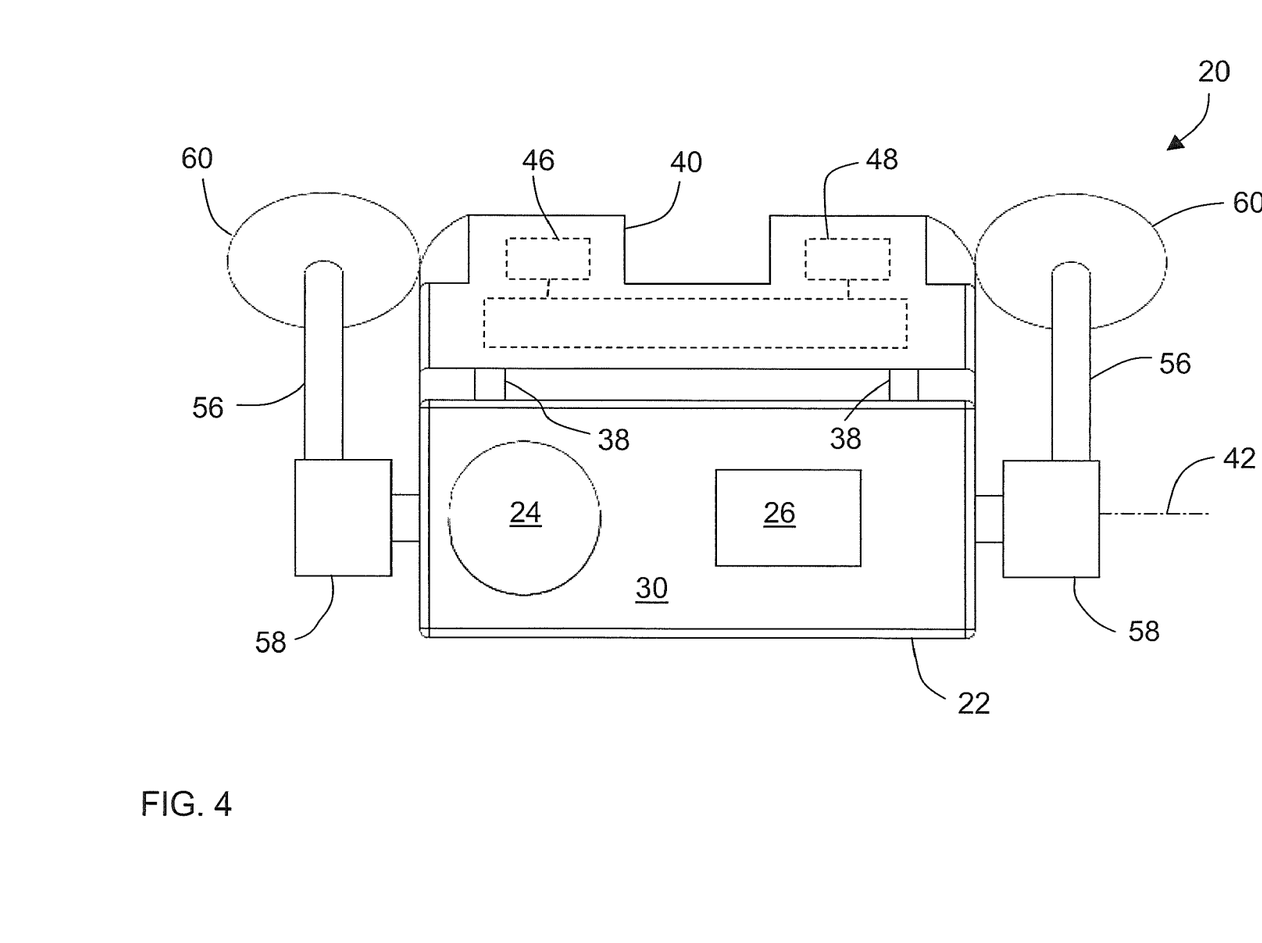
FIG. 4 is a front plan view illustration of the overhead clearance detection system of FIG. 1.
Figure 5:
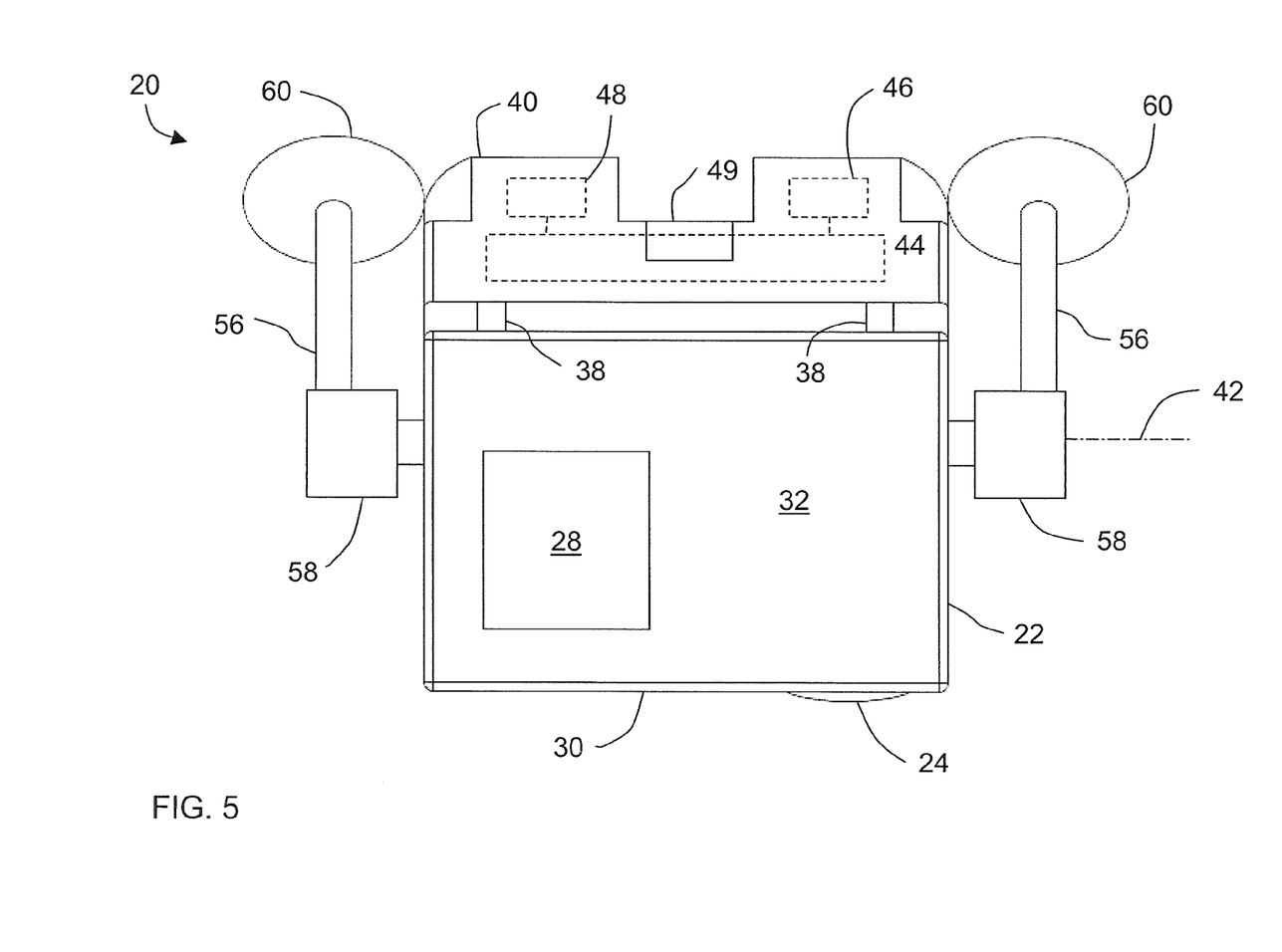
FIG. 5 is a bottom plan view illustration of the overhead clearance detection system of FIG. 1.
Figure 6:
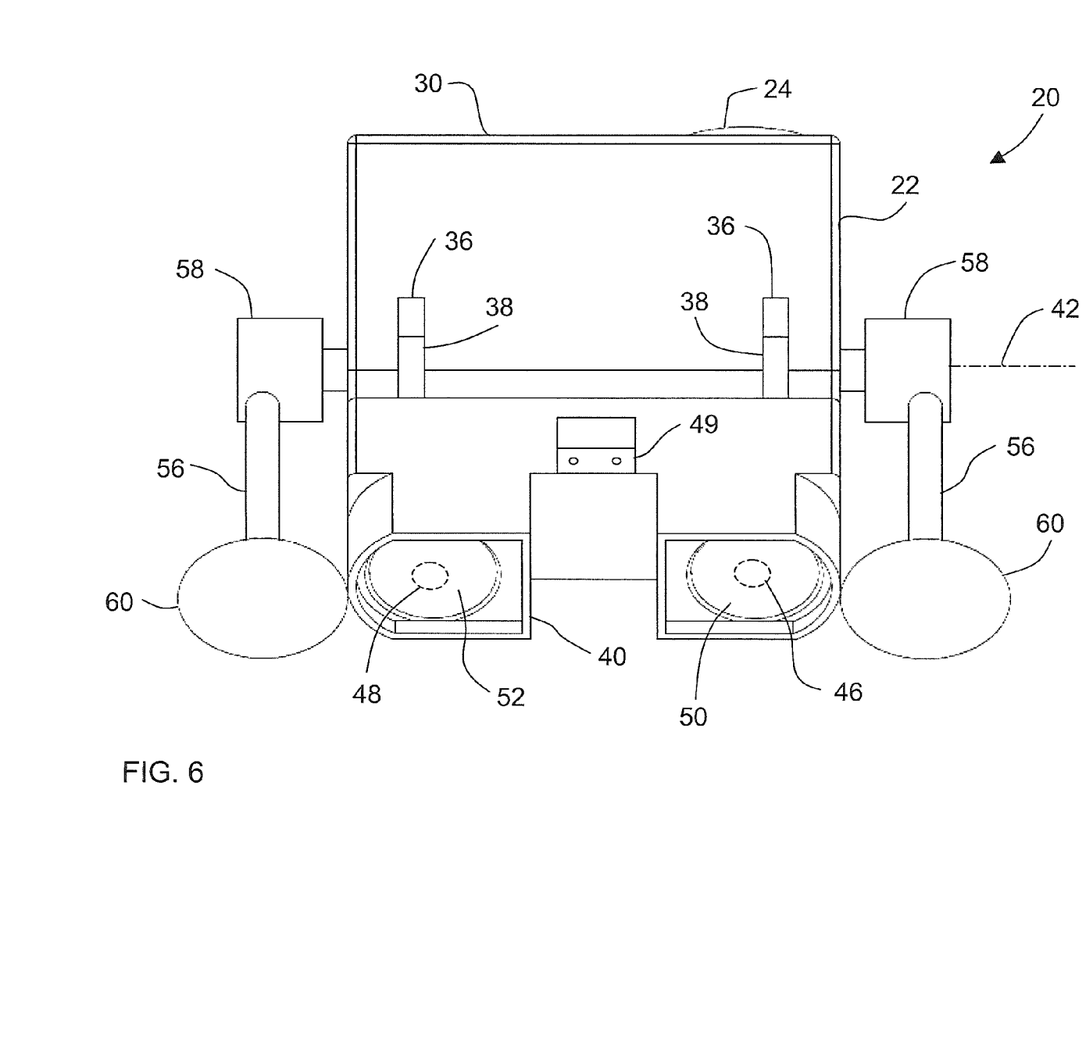
FIG. 6 is a top plan view illustration of the overhead clearance detection system of FIG. 1.

The housing 22 further includes a battery housing cover 28 (FIG. 5). In the exemplary embodiment, the cover 28 is arranged on the bottom surface 32. The overhead clearance detection device 20 may be powered one or more batteries arranged beneath the cover 28 (not shown), such as four 1.5V batteries connected in series for example, or from an external power supply such a vehicle's 12V power supply (not shown) for example. The external power supply may be coupled to the overhead clearance detection system 20 by a commercially available adapter (not shown) connected to a DC power jack 34. On a side opposite the DC power jack 34, the housing 22 includes a plurality of openings 54. The openings 54 facilitate the transmission of sound from an audio device, such as a piezoelectric buzzer for example, to alert the operator.

A pair of slots 36 are arranged in the housing 22 on a portion of the housing 22 opposite the front side 30. The slots 36 are sized to receive arms 38 coupled to a sensor housing 40. In the exemplary embodiment, the arms 38 are coupled to the housing 22 to allow rotation of the sensor housing 40 about an axis 42. The coupling of the arms 38 to the housing 22 provides a means of securing the sensor housing 40 in position during use, but also allowing the operator to adjust the angle of the sensor housing 40 through the application of a small or moderate amount of force.

The sensor housing 40 holds a distance measurement sensor 44. In the exemplary embodiment, the distance measurement sensor 44 is an optical rangefinder that includes a transmitter 46 and a receiver 48 and that operates through infrared triangulation, such as Distance Measuring Sensor Unit model number GP2Y0A710K0F manufactured by Sharp Corporation. The distance measurement sensor 44 may also be a laser range finding device, a sensor based on radio detection and ranging (RADAR) technology, or a sensor based on ultra wide band technology for example. The sensor housing 40 may also include lenses 50, 52 to cover and protect the transmitter 46 and receiver 48. In the exemplary embodiment, the distance measurement sensor 44 uses a narrowly focused infrared transmitter having a functional range for detecting objects at a distance of 3.3 feet (100 centimeters) to 18 feet (550 centimeters). In one embodiment, the receiver has a position sensitive detector for detecting the infrared optical signal. The position sensitive detector may be, but is not limited to, an active pixel sensor, a charge coupled device (CCD), or a complementary metal-oxide semiconductor (CMOS) device for example. In the exemplary embodiment, the distance measurement sensor 44 operates on a supply voltage of 4.5V to 5.5V and has an output voltage that varies based on the distance measured from approximately 0.5V to 3.3V.

The distance measurement sensor 44 has a predetermined voltage-distance output voltage profile based on the distance measured. In some embodiments, the distance measurement sensor 44 may have a voltage-distance profile where the output voltage drops-off rapidly for very close objects. An object at 6 inches from the sensor for example, may result in the same output signal as an object at 5 feet. It should be appreciated that this may result in erroneous detections when close objects, such as windshield wipers for example, are detected by the overhead clearance detection system 20. In one embodiment, the overhead clearance detection system 20 also includes a short-range sensor 49. The short-range sensor 49 may be substantially similar to the distance measurement sensor 44, except that the functional range operates over a short distance, such as less than one foot for example. As will be discussed in more detail below, the output signal from the short-range sensor 49 may be used in determining whether a detected object is of a valid clearance issue.

The overhead clearance detection system 20 may also include one or more mounting arms 56. In the exemplary embodiment, the mounting arms 56 are coupled to the housing 22 by a mechanism 58 such that the housing 22 rotates about the axis 42. The mechanism 58 may be any suitable arrangement that holds the housing 22 in position relative to the arms 56 during operation of the vehicle. In the exemplary embodiment, the mechanism 58 is a soft ratchet type mechanism. It is desirable to have the torque required to rotate the housing 22 to be greater than the torque required to rotate the sensor housing 40. This provides the advantage of allowing the operator to adjust the orientation of the sensor housing 40 without affecting the orientation of the housing 22.

On an opposite end from the locking mechanism 58, a coupler device such as suction cup 60 for example, provides a means for removably attaching the overhead clearance detection system 20 to a surface, such as a vehicle windshield 62 (FIG. 12) for example. Other types of coupler devices, such as an adhesive or a bolted bracket may also be used. It should be appreciated that while the embodiments described herein refer to coupling the overhead clearance detection system 20 to a windshield, the claimed invention should not be so limited. In other embodiments, the overhead clearance detection system 20 may be incorporated into, or attached to or otherwise rest upon the rear-view mirror or the vehicle dashboard for example.

In the exemplary embodiment, it is desirable that the distance between the vehicle's windshield and the portion of the sensor housing 40 surrounding the lenses 50, 52 be less than or equal to 1 mm. If the distance may be greater than 1 mm (such as for example if the sensor housing 40 may be rotated into positions not perpendicular to the windshield) the windshield may reflect a portion of the signal emitted from the transmitter 46 back into the receiver 48, potentially resulting in erroneous output from the distance measurement sensor 44. In embodiments where the distance is greater than about 1 mm, it may be desirable to couple a tube of flexible material (such as soft rubber or foam for example) (not shown) to the portion of the sensor housing 40 surrounding the lens 50 in front of the transmitter 46 such that the tube closes the gap between the portion of the sensor housing 40 and the windshield but does not block the signal emitted from the transmitter 46.

Figure 7:
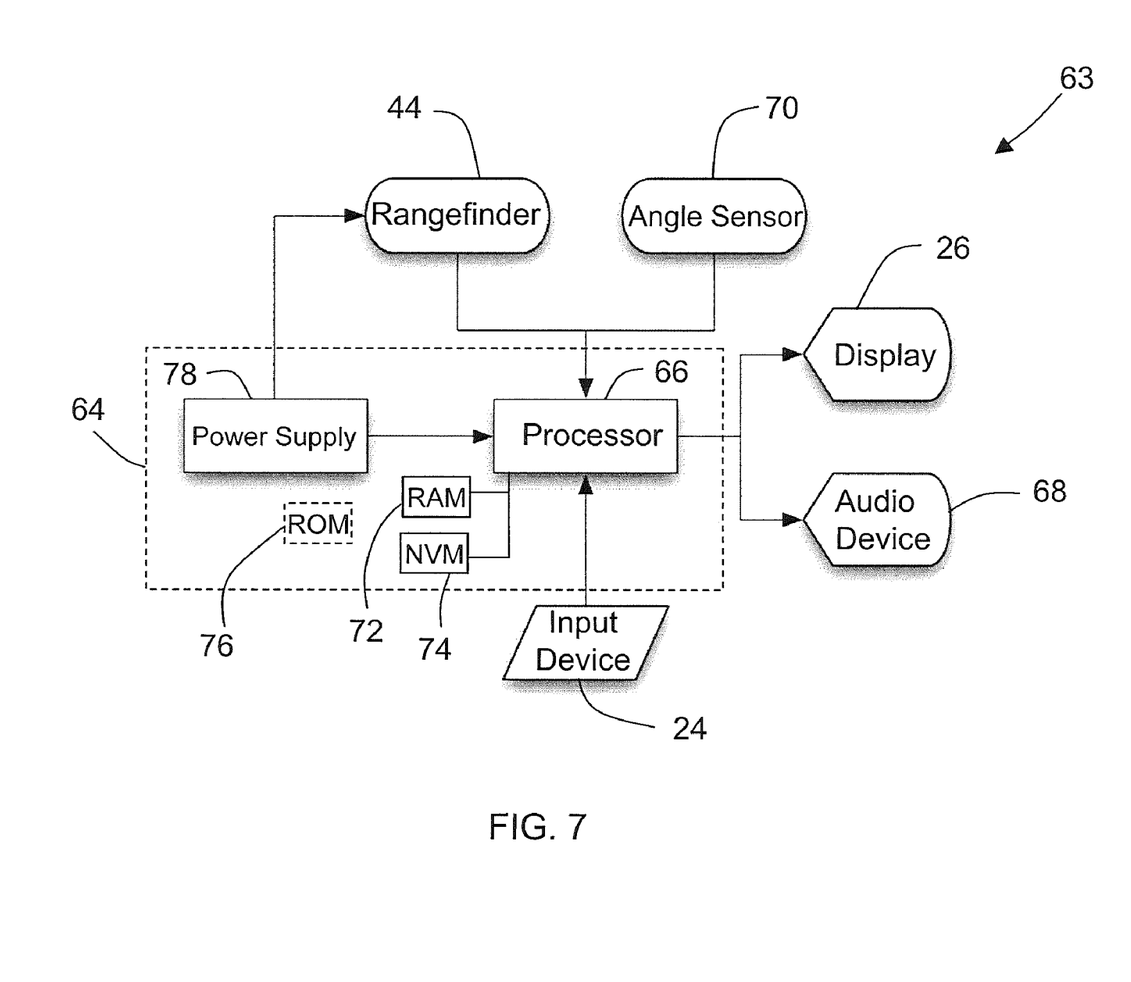
FIG. 7 is a schematic block diagram of the overhead clearance detection system of FIG. 1.
Figure 8:
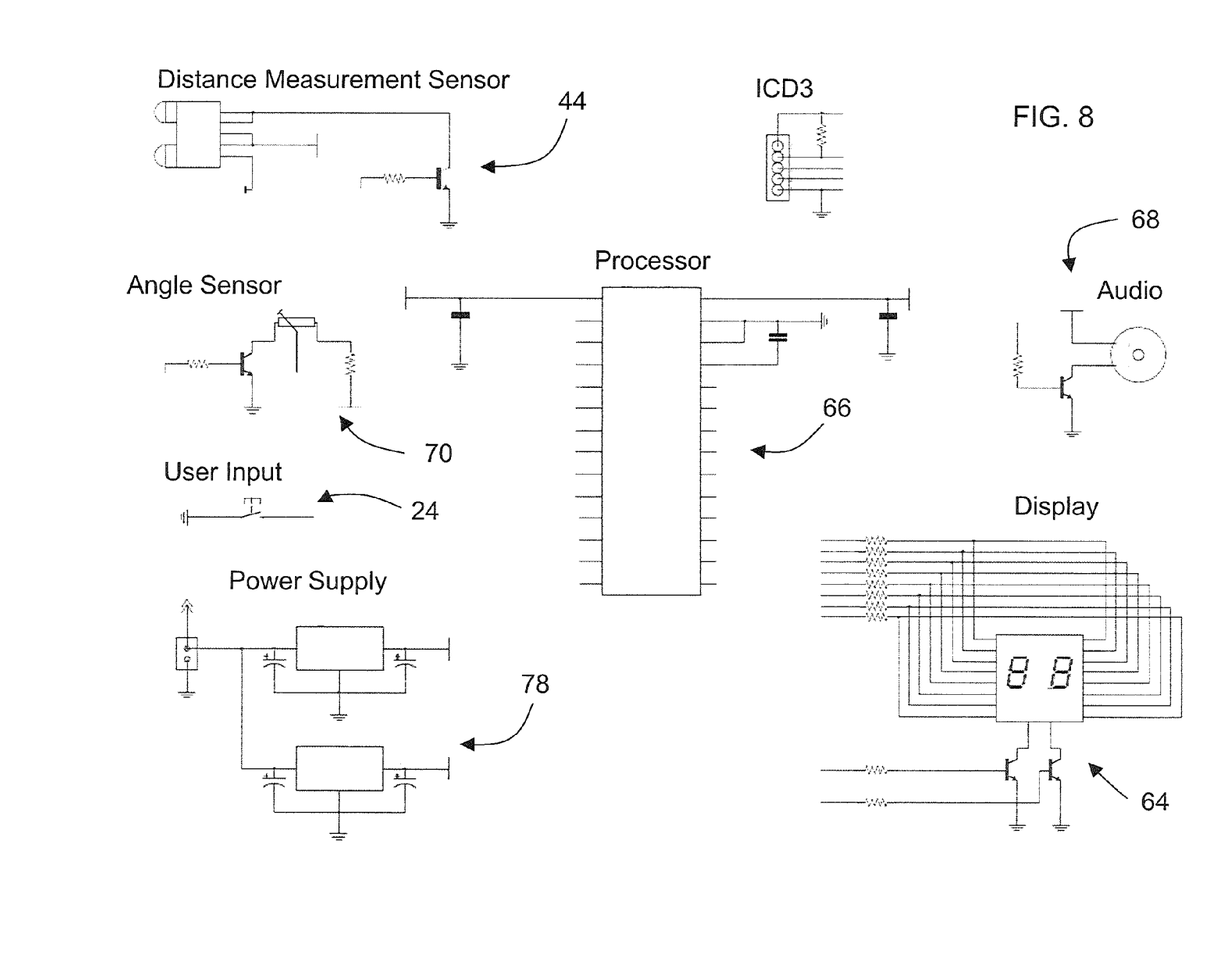
FIG. 8 is a schematic diagram illustration of an embodiment of the circuit used in the overhead clearance detection system of FIG. 1.

A system 63, as illustrated in FIG. 7, controls the operation of overhead clearance detection system 20. Controller 64 is a suitable electronic device capable of accepting data and instructions, executing the instructions to process the data, and presenting the results. Controller 64 may accept instructions through user interface, or through other means such as but not limited to user input device 24, electronic data card, voice activation means, radiated wavelength and electronic or electrical transfer. Therefore, controller 64 can be a microprocessor, microcontroller, microcomputer, a minicomputer, an optical computer, a board computer, a complex instruction set computer, an ASIC (application specific integrated circuit), a reduced instruction set computer, an analog computer, a digital computer, a solid-state computer, a single-board computer, a buffered computer, a laptop computer, or a hybrid of any of the foregoing. One embodiment of a circuit for controller 64 is illustrated in FIG. 8.

Controller 64 is capable of converting the analog voltage or current level provided by distance measurement sensor 44 into a digital signal indicative of the distance from distance measurement sensor 44 to a detected object. Alternatively, distance measurement sensor 44 may be configured to provide a digital signal to controller 64, or an analog-to-digital (A/D) converter (not shown) may be coupled between distance measurement sensor 44 and controller 64 to convert the analog signal provided by distance measurement sensor 44 into a digital signal for processing by controller 64. Controller 64 uses the digital signals as input to various processes for controlling the overhead clearance detection system 20. Other digital signals within the controller 64 may also represent one or more collision detection system 20 data including but not limited to distance to the object, a vertical height measurement, current state of an alarm and the like.

Controller 64 is operably coupled with one or more other components of system 20 by data transmission media. Data transmission media includes, but is not limited to, wired connections, printed circuit board traces, pads, through-holes and vias, twisted pair wiring, coaxial cable, and fiber optic cable. Data transmission media also includes, but is not limited to, wireless, radio and infrared signal transmission systems. Controller 64 is configured to provide operating signals to components and to receive data from components via data transmission media.

In general, controller 64 accepts data from distance measurement sensor 44 and an angle sensor 70, and is given certain instructions for the purpose of processing the data from distance measurement sensor 44 and angle sensor 70 to derive certain operational values. Controller 64 accepts data from distance measurement sensor 44, for example, to determine the linear distance 92 from distance measurement sensor 44 to an object 110. Controller 64 also accepts data from angle sensor 70, for example, to determine the angle 90 between the sensor housing 40 and the housing 22. The controller 64 compares one or more of the operational values to predetermined parameters (e.g. clearance height 88 threshold value) and if a predetermined variance is exceeded, generates a signal that may be used to indicate an alarm to an operator via display 26 and/or audio device 68. Controller 64 also accepts data from user input device 24 and is given certain instructions for the purpose of processing the data from user input device 24 to alter one or more of the predetermined parameters (e.g. clearance height 88 threshold value) or to change the state of the system 20 (e.g. turn the system on, silence an alarm). Controller 64 also provides operating signals to optical sensor 44, display 26 and audio device 68.

In addition to being coupled to one or more other components within overhead clearance detection system 20, controller 64 may also be coupled to external electrical devices, controllers or computers such as a vehicle control system or an in-dash entertainment system for example. In one embodiment, the display 26 and the audio device 68 are integral with the vehicle's in-dash entertainment system or radio. In another embodiment, the functionality of controller 64 is integrated into the vehicle control system, the in-dash entertainment system or radio. In yet another embodiment, the controller 64 communicates with the vehicle control system, the in-dash entertainment system or radio via a wireless protocol, such as IEEE 802.11 protocol or Bluetooth for example.

Controller 64 includes a processor 66 coupled to a random access memory (RAM) device 72 and a non-volatile memory (NVM) device 74. The processor 66 may also include an optional read-only memory (ROM) device 76, one or more input/output (I/O) controllers, and a communications device. In the exemplary embodiment, the processor 66 is a microcontroller including one or more analog-to-digital converters and one or more digital input pins capable of generating a change notification interrupt such as model PIC24FJ64GA002 manufactured by Microchip Technology, Inc. In the exemplary embodiment, the processor 66, RAM device 72 and NVM device 74 are formed in an integrated circuit. In one embodiment, the processor 66 has sufficient processing speed to complete a processing loop in less than or equal to 20 milliseconds.

Figure 9:
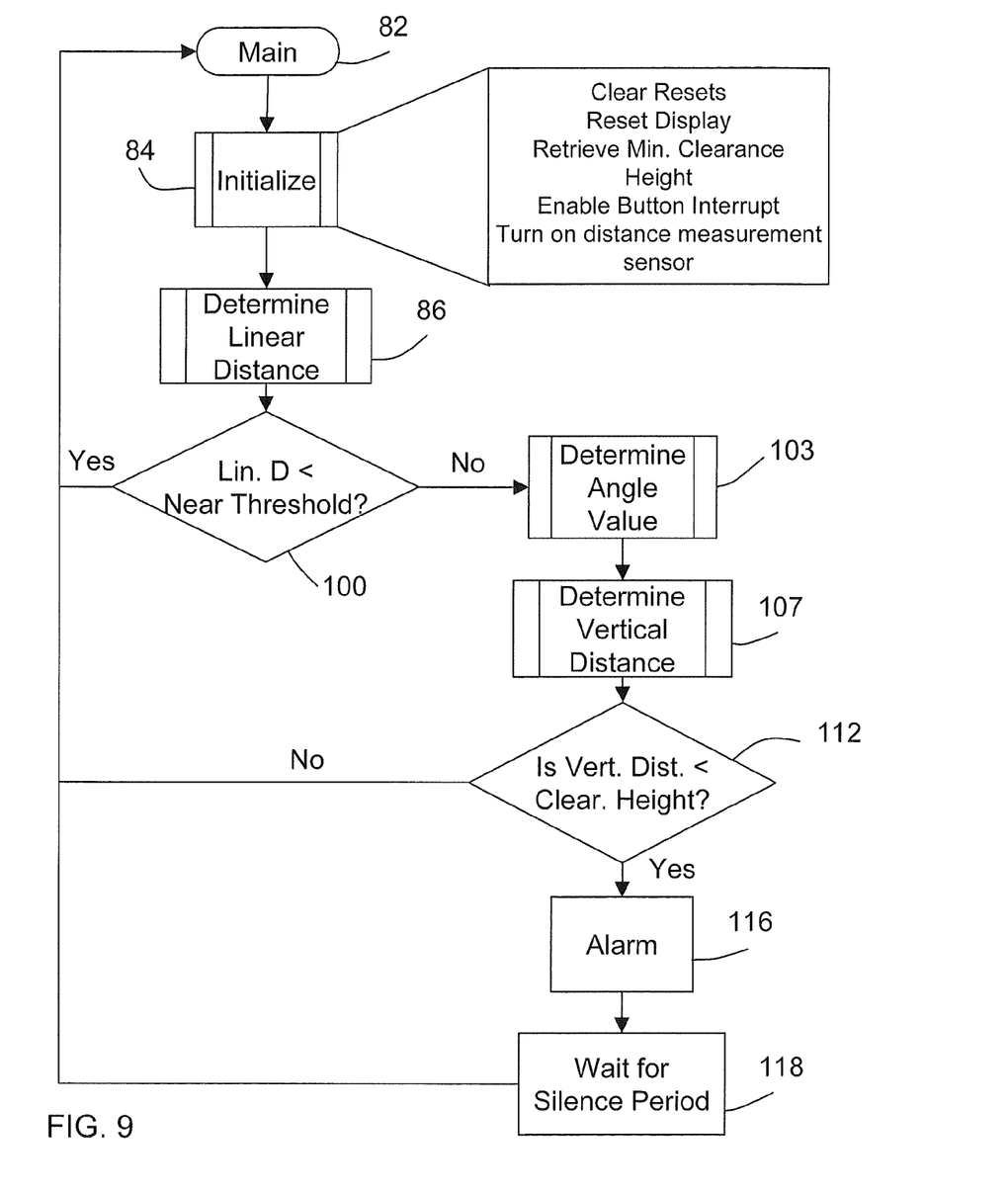
FIG. 9 is a flow diagram illustrating a method of operating the overhead clearance detection system in accordance with an embodiment of the invention.
Figure 10:
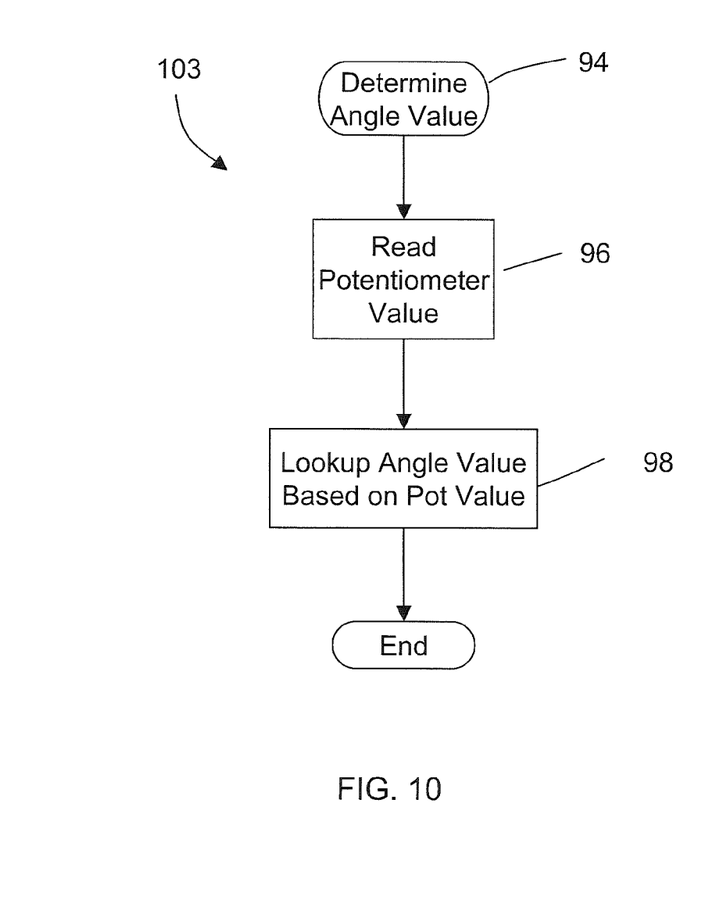
FIG. 10 is a flow diagram illustrating one embodiment for determining a threshold value for the method of operation of FIG. 9.
Figure 11:
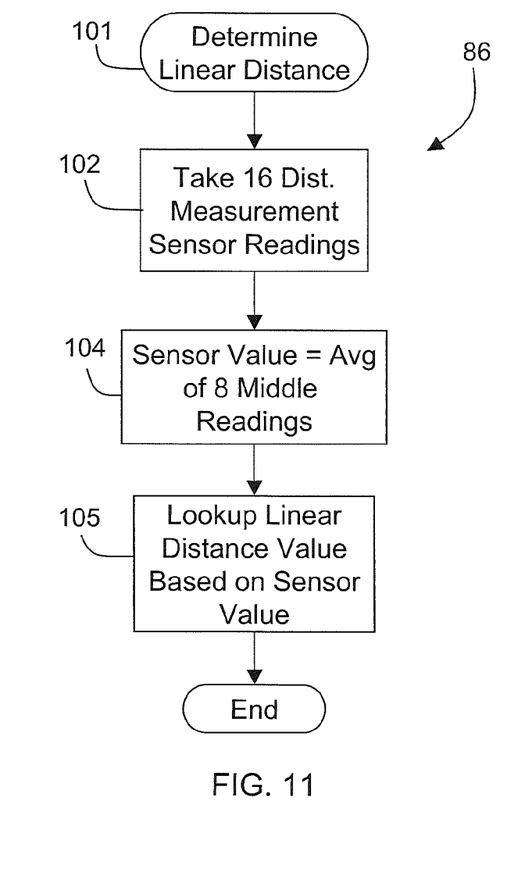
FIG. 11 is a flow diagram illustrating one embodiment for determining a sensor value for the method of operation of FIG. 9.

NVM device 74 is any form of non-volatile memory such as EPROM (Erasable Programmable Read Only Memory), flash memory, a disk drive, or the like. NVM device 74 stores an application code, e.g., main functionality firmware, including initializing parameters, and boot code, for processor 66. Application code also includes program instructions as shown in FIGS. 9-11 for causing processor 66 to execute overhead clearance detection system 20 operation control methods, including starting and stopping operation, changing operational states of the system 20, converting analog voltage levels from distance measurement sensor 44 into digital values representing a linear distance 92 from distance measurement sensor 44 to an object 110, converting analog voltage levels from angle sensor 70 into digital values representing the angle 90 between sensor housing 40 and housing 22, deriving a vertical distance 106 based on the linear distance 92 and sensor housing angle 90, comparing vertical distance 106 with a desired clearance height 88, and generating alarms. It will be recognized that application code can be stored in a ROM device 76 rather than in NVM device 74.

NVM device 74 also stores various operational parameters for the application code. The various operational parameters can be input to NVM device 74 using user input device 24, or the vehicle's control system.

Controller 64 includes operation control methods embodied in application code shown in FIGS. 9-11. These methods are embodied in computer instructions written to be executed by processor 66, typically in the form of software. The software can be encoded in any language, including, but not limited to, assembly language, Perl, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

Controller 64 further includes a power supply 78. The power supply 78 receives electrical power either from one or more batteries, or from a power supply via DC input jack 34. The power supply 78 adapts the electrical power to have characteristics suitable for the controller 66 and the distance measurement sensor 44. In the exemplary embodiment, the power supply 78 includes two low-dropout voltage regulator integrated circuits to convert the input voltage to 3.3V for the processor 66 and 5.0V for the distance measurement sensor 44. In some embodiments, the power supply 78 includes a charging circuit to allow one or more batteries to be recharged when the connector 34 is connected to a vehicle power adapter.

Figure 12:
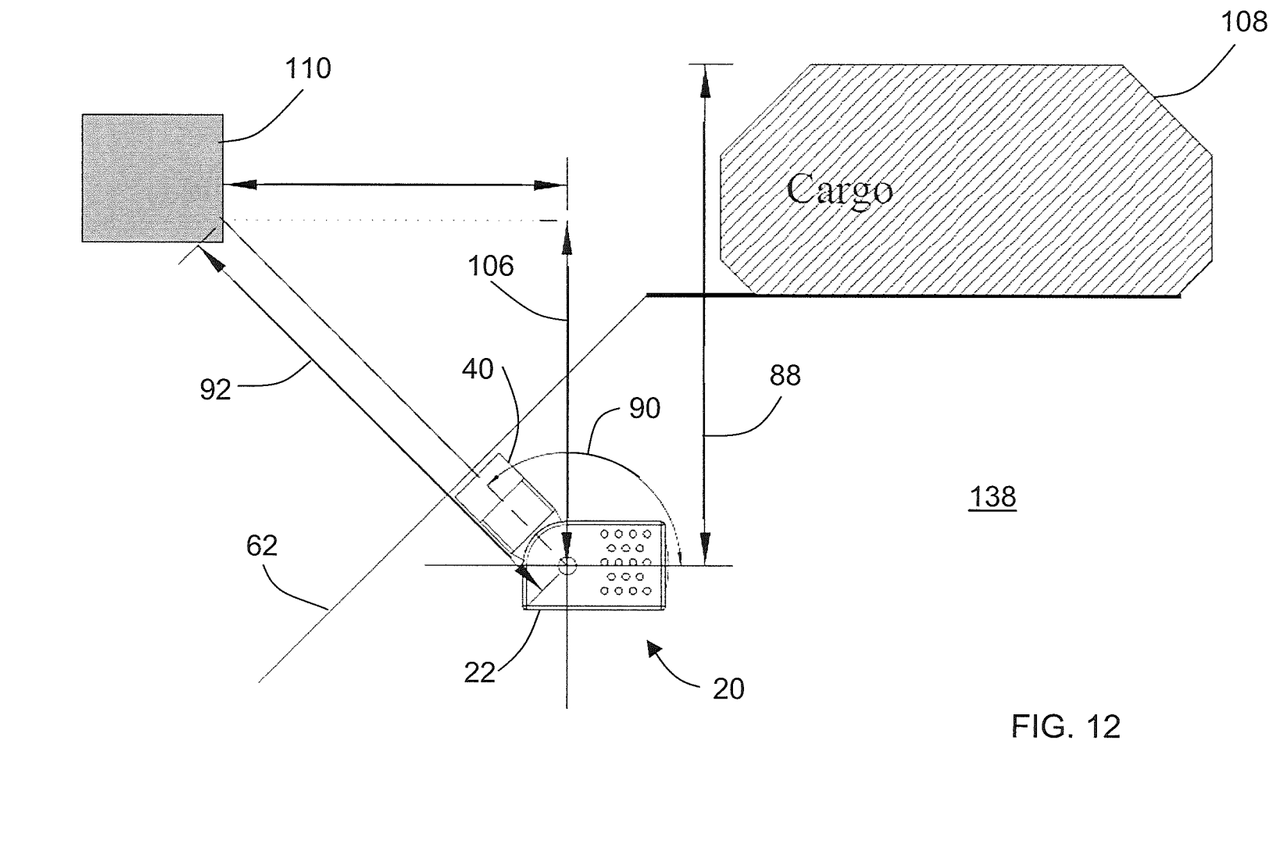
FIG. 12 is a schematic illustration of the overhead clearance detection system of FIG. 1 installed in a vehicle; and, FIG. 13 is a state diagram of the overhead clearance detection system of FIG. 1.

Referring now to FIG. 9 and FIG. 12, a method 80 of operating the overhead clearance detection system 20 will be described. The method 80 starts in block 82, such as from a hard or a soft reset of the controller 64. The method 80 then proceeds to initialize block 84 where the method 80 implements several operational methods, including but not limited to clearing resets, retrieving a clearance height threshold value from memory, resetting the display, enabling the user input device 24, and turning on the distance measurement sensor 44. In the exemplary embodiment, once distance measurement sensor 44 is turned on, the transmitter 46 continuously emits a series of infrared pulses. If an object 110 is in the path of any pulse and within the operating range of the distance measurement sensor 44, the pulse is reflected off the object and received by the receiver 48. Once the reflected pulse is received (or after an appropriate delay that indicates no such reflection will be received), the distance measurement sensor 44 outputs a voltage level corresponding to the linear distance from the distance measurement sensor 44 to the object 110 (or outputs a voltage level corresponding to a distance greater than the distance measurement sensor's maximum operating range if no such object is detected) and maintains the voltage output level until the next infrared pulse has been emitted and its reflection (or lack thereof) processed. In other embodiments, controller 64 may directly control the timing, frequency or processing of pulses emitted from transmitter 46, may turn distance measurement sensor 44 off during periods when it is not required (e.g. while other processing functions are being performed or while an alarm is activated), or may interface with a distance measurement sensor 44 that operates through a means other than infrared triangulation, such as a laser range finding device, a sensor based on radio detection and ranging (RADAR) technology, or a sensor based on ultra-wideband technology for example.

Once the overhead clearance detection system 20 is initialized, the method 80 proceeds to block 86 where a linear distance value corresponding to the linear distance 92 from the distance measurement sensor 44 to the nearest obstacle 110 is determined. The method of determining the linear distance value starts in block 101 and proceeds to block 102 where the distance measurements being continuously produced by the distance measurement sensor 44 in the form of analog voltage levels are converted into 16 interim digital sensor values through the repeated use of an analog-to-digital converter. It is desired that the timing of the 16 analog to digital conversions be such that the group of 16 interim digital sensor values represents multiple discrete distance measurement outputs from the distance measurement sensor 44 as well as multiple conversions of each such measurement. The method in block 102 discards the highest 4 and lowest 4 interim digital sensor values and derives an average digital sensor value by averaging the remaining 8 interim digital sensor values in block 104. The linear distance value is then determined in block 105 by means of a lookup table that associates average digital sensor values with their corresponding linear distance values. In other embodiments, the linear distance value may be determined formulaically based on the average digital sensor value or the average digital sensor value may be used as directly equivalent to the linear distance value.

It will be appreciated that the method of making multiple analog-to-digital conversions of the output from distance measurement sensor 44, of discarding high and low values from those conversions, and of averaging the remaining values is intended to compensate for noise that may be inherent in the output of distance measurement sensor 44, and that other embodiments using other types of distance measurement sensors may employ alternative noise reduction methods appropriate to the output characteristics of such sensors.

The method 80 then proceeds to query block 100 where the linear distance value is compared with a pre-determined threshold value. If the linear distance value is less than or equal to the pre-determined threshold value, the method 80 loops back to block 86. In this manner, near objects, such as a passing windshield wiper for example, may be prevented from erroneously triggering an alarm. If the linear distance value is greater than the pre-determined threshold value, query block 100 returns a negative and method 80 proceeds to block 103. In other embodiments, wherein a short-range distance measurement sensor 49 is incorporated, block 100 may read the output signal of the short-range sensor to determine whether the linear distance value derived in block 86 may be the result of an object closer than the pre-determined threshold value for linear distance.

The method 80 then proceeds to block 103 where an angle value is determined. In one embodiment, shown in FIG. 10, the angle sensor 70 is a linear potentiometer attached to the housing 22 with the potentiometer knob parallel to and centered on the axis 42. The knob of the potentiometer is used to couple one or both of the arms 38 to the housing 22. Rotation of sensor housing 40 causes the potentiometer knob to rotate, which in turn varies the potentiometer's resistance, producing an output voltage in linear proportion to the sensor angle 90. In this embodiment, the method of determining the angle value is illustrated in FIG. 10. The method of determining the angle value starts in block 94 and proceeds to block 96 where the analog voltage level produced by the potentiometer is converted into a digital potentiometer value through the use of an analog-to-digital converter. The angle value is then determined in block 98 by means of a lookup table that associates digital potentiometer values with their corresponding angle values. In other embodiments the angle value may be determined formulaically based on the digital potentiometer value or the digital potentiometer value may be used as directly equivalent to the angle value.

With the linear distance value and the angle value determined, the method 80 then proceeds to block 107 where a vertical distance value corresponding to the vertical distance 106 from the distance measurement sensor 44 to the object 110 is determined. In the exemplary embodiment, the vertical distance value is determined by means of a lookup table that associates each combination of linear distance value and angle value with a corresponding vertical distance value. In other embodiments the vertical distance value may be determined formulaically based on the linear distance value, the angle value and trigonometric properties of right triangles.

With the vertical distance value determined, the method 80 then proceeds to query block 112 where the linear distance value is compared with a user-defined clearance height threshold value that corresponds to a height greater than or equal to the clearance height 88. If the query block 112 returns a negative, the object 110 will not collide with the cargo 108 and the method 80 loops back to block 86.

If the query block 112 returns a positive, meaning that the vertical distance value is less than the clearance height 88 threshold value, the object 110 presents a low clearance obstacle and may collide with the cargo 108. The method 80 then proceeds to block 116 where an alarm is initiated. The alarm may be audible, visual or both. Once the alarm is activated, the method 80 remains in block 116 until the alarm is silenced, at which point the method 80 proceeds to block 118 where the method 80 waits until the expiration of a predetermined silence period during which no alarms will be activated. After the expiration of the silence period the method 80 loops back to block 86 and the process repeats.

In other embodiments, the methods in block 86 and block 103 may be reversed such that the angle value is determined before the linear distance value. In still other embodiments, the determination whether to activate an alarm may proceed by deriving from the clearance height threshold value and the sensor angle a first linear distance from the distance measurement sensor 44 to an object, such that any object at a linear distance from the distance measurement sensor 44 less than the first linear distance would pose a low clearance obstacle and may collide with the cargo. By comparing the linear distance value determined in block 86 with such a first linear distance, such other method could determine whether to initiate an alarm.

Figure 13:
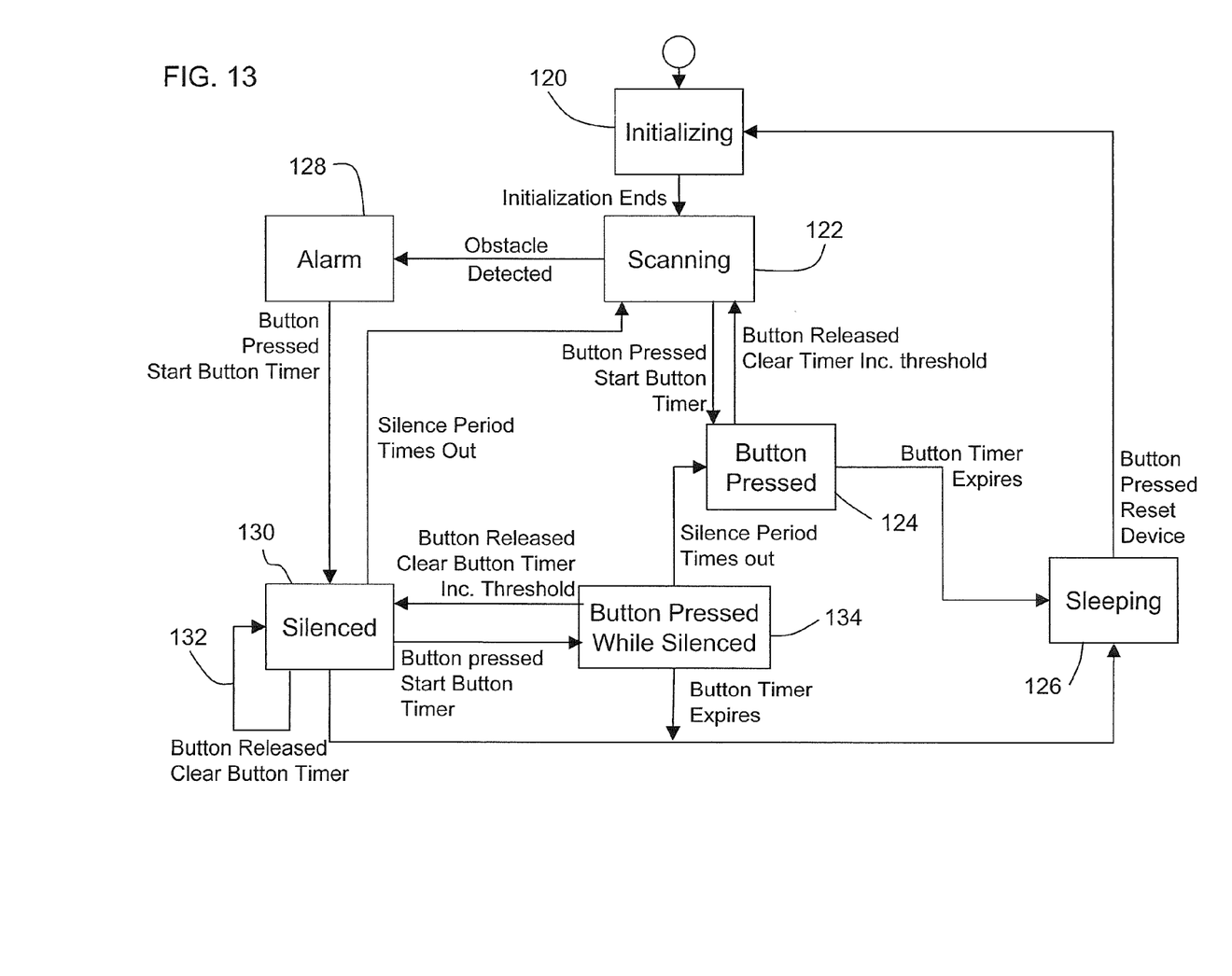

The user input device 24 provides several functions to the operator in a single device. In the exemplary embodiment, the user input device 24 is a momentary button and the operator may actuate the user input device 24 to switch the overhead clearance detection system 20 between on and off (or sleep) states, set the desired clearance height 88 threshold value, and also cancel an activated alarm. The function provided will depend on the state of the overhead clearance detection system 20. One embodiment of operating the overhead clearance detection system 20 is illustrated in FIG. 13. This embodiment is carried out by the controller 64 and may be described in terms of a finite state machine. Finite state machines, commonly referred to as state machines, are widely used in user designs for a variety of purposes, including controlling sequences of actions. A state machine is a model of behavior comprising states and transitions. A state represents the sequence of inputs to the state machine from its start to the present moment. A transition specifies a change in state from the current state, often, though not necessarily, as a result of one or more inputs received. In hardware, state machines are typically implemented as registers to store state variables and combinatorial logic gates to implement transitions and state machine outputs.

The overhead clearance detection system 20 begins in an initialization state 120. Once the subsystems and initial variables are set, the overhead clearance detection system 20 moves to a scanning state 122. In scanning state 122, the overhead clearance detection system 120 processes data from the distance measurement sensor 44 and angle sensor 70 and determines if there is a potential for a collision with an object 110. If the user input device 24 is actuated during the scanning state 122, the overhead clearance detection system 20 transitions to a first button pressed state 124 and a button timer is activated. If the operator releases the user input device 24 before the button timer expires, the overhead clearance detection system 20 increments the clearance height 88 threshold value, clears the button timer, and transitions back to scanning state 122. By repeatedly actuating the user input device 24, the operator may increment the clearance height 88 threshold value to the desired level. In one embodiment, if the operator attempts to increment the clearance height 88 threshold value above a first predetermined value (e.g. a maximum value), the clearance height 88 threshold value is set to a second predetermined value (e.g. a minimum value). The clearance height 88 threshold value is displayed on the display 26. If the user input device 24 is not released before the button timer expires, the overhead clearance detection system 20 transitions to sleep mode 126. In sleep mode 126, the overhead clearance detection system 20 enters a low power usage state to conserve electrical power. The overhead clearance detection system 20 stays in sleep state 126 until the further actuation of the user input device 24 transitions the overhead clearance detection system 20 back to initialization state 120.

When in the scanning state 122, if an object 110 is detected where there is a risk of collision, the overhead clearance detection system 20 transitions to alarm state 128. In alarm state 128, the overhead clearance detection system 20 produces an audible and/or visual indication to the operator as described herein above. When the user input device 24 is activated while in alarm state 128, the overhead clearance detection system 20 transitions to silenced state 130 and the button timer and a silence period timer are started with the button timer configured to expire before the silence period timer. If the user input device 24 is released before the button timer expires, the button timer is cleared 132 and the overhead clearance detection system 20 remains in silenced state 130. Once the silence period timer expires, the overhead clearance detection system 20 transitions back to scanning state 122. If the operator does not release the user input device 24 before the button timer expires, the overhead clearance detection system 20 transitions 136 to sleep mode 126.

While in silenced state 130, if the user input device 24 is activated, the overhead clearance detection system 20 transitions to a second button pressed state 134 and the button timer is started. If the user input device 24 is released before the button timer expires, the clearance height 88 threshold value is incremented. In one embodiment, if the operator attempts to increment the clearance height 88 threshold value above a first predetermined value (e.g. a maximum value), the clearance height 88 threshold value is set to a second predetermined value (e.g. a minimum value). If the button timer expires before the operator releases the user input device 24, the overhead clearance detection system 20 transitions 136 to sleep mode 126. If the silence period timer expires while the overhead clearance detection system 20 is in the second button pressed state 134, the overhead clearance detection system 20 transitions to first button pressed state 124.

In the exemplary embodiment, the overhead clearance detection system 20 is removably installable within the interior compartment 138 of a vehicle. The operator couples the overhead clearance detection system 20 to the inside of the windshield 62, such as with the suction cups 60 for example. With the overhead clearance detection system 20 attached to the windshield 62, the operator may adjust the position of the housing 22 such that it is substantially horizontal relative to the vehicle. It should be appreciated that the operator may adjust the housing 22 prior to attaching the overhead clearance detection system 20 to the windshield 62.

With the overhead clearance detection system 20 attached, the operator adjusts the angle 90 of the sensor housing 40 to direct any signal from the distance measurement sensor 44 through the windshield 62. In general, the operator may adjust the sensor housing 40 such that the signal is substantially perpendicular to the windshield 62. However, in some circumstances, such as when the cargo 108 is long and extends beyond the front edge of the vehicle roof, the operator may adjust the angle of the sensor housing 40 to direct the optical signal to provide a signal path that extends in front of the cargo 108.

Next the operator turns on the overhead clearance detection system 20 by activating the user input device 24. At this point, the overhead clearance detection system 20 starts scanning for objects 110. By further activation of the user input device 24, the operator may adjust the vertical height 88 threshold value to indicate the vertical distance 88 from the distance measurement sensor 44 to the highest point on the cargo 108. The operator may drive the vehicle and in the event that the vertical height 106 of an object 110 above the distance measurement sensor 44 is less than the vertical distance 88 threshold value, an alarm will be sounded to alert the operator of the potential collision.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An overhead clearance detection system for a vehicle having a windshield comprising:
    a first sensor having a transmitter for emitting a first signal through said windshield and a receiver, the signal being emitted on an angle less than 90 degrees relative to a roof of said vehicle; and,
    a controller electrically coupled to said first sensor, said controller having a processor responsive to executable instructions when executed on said processor for determining vertical distance in response to said receiver detecting said first signal and comparing said vertical distance to a predetermined threshold.

2. The overhead clearance detection system of claim 1 wherein said first signal is an infrared light signal.

3. The overhead clearance detection system of claim 1 further comprising:
    an input device electrically coupled to said controller; and,
    a visual display electrically coupled to said controller;
    wherein said predetermined threshold is a height threshold and said processor is further responsive to executable computer instructions when executed on said processor for setting said height threshold and displaying said height threshold in response to a second signal from said input device.

4. The overhead clearance detection system of claim 3 further comprising:
    an audio device electrically coupled to said controller;
    wherein said processor is further responsive to executable computer instructions when executed on said processor for activating said audio device in response to determining said vertical distance is less than said height threshold.

5. The overhead clearance detection system of claim 1 wherein said sensor is rotatably coupled to said windshield.

6. The overhead clearance detection system of claim 5 further comprising a second sensor adjacent said first sensor, wherein said first sensor has a first operating range and said second sensor has a second operating range, wherein said first operating range extends farther than said second operating range.

7. An overhead clearance detection system for a vehicle having a windshield comprising:
    a housing;
    an infrared optical sensor coupled to said housing and arranged to emit an optical signal substantially perpendicular to said windshield and at a non-vertical angle;
    an angle sensor operably coupled to said controller for determining an angle formed between said at least one arm and said housing; and,
    a controller arranged in said housing, said controller being coupled to receive a signal from said infrared optical sensor, wherein said controller has a processor responsive to executable computer instructions when executed on said processor for determining a vertical distance in response to a first signal from said infrared optical sensor and a second signal from said angle sensor.

8. An overhead clearance detection system for a vehicle having a windshield comprising:
    a housing;
    an infrared optical sensor coupled to said housing and arranged to emit an optical signal substantially perpendicular to said windshield; and,
    a controller arranged in said housing, said controller being coupled to receive a signal from said infrared optical sensor, wherein said controller has a processor responsive to executable computer instructions when executed on said processor for determining a vertical distance in response to a first signal from said infrared optical sensor;
    at least one arm rotatably coupled to said housing;
    a coupler arranged on one end of at least one arm; and,
    wherein said infrared optical sensor is rotatably coupled to said housing.

9. The overhead clearance detection system of claim 8 further comprising:
    a user input device mounted on said housing and electrically coupled to said controller; and, a display mounted on said housing and electrically coupled to said controller;

wherein said processor is further responsive to executable instructions when executed on said processor for setting a threshold in response to a user actuation of said user input device and for displaying said threshold on said display.

10. The overhead clearance detection system of claim 9 further comprising:

an audio device operably coupled to said controller; and, an angle sensor operably coupled to said controller for determining an angle formed between said at least one arm and said housing;

wherein said processor is further responsive to executable instructions when executed on said processor for determining said vertical distance in response to receiving said first signal and a second signal from said angle sensor.

11. The overhead clearance detection system of claim 10 wherein said processor is further responsive to executable instructions when executed on said processor for activating said audio device in response to said vertical distance is less than or equal to said threshold.

12. The overhead clearance detection system of claim 11 wherein:

said audio device is a piezoelectric device;

said display is a 7-segment light emitting diode display; and, said angle sensor is a linear potentiometer operably coupled between said housing and said at least one arm.

13. The overhead clearance detection system of claim 12 wherein said coupler is a suction cup.

14. A method of operating an overhead clearance detection system in a vehicle having a windshield comprising:

determining a height threshold;

emitting a signal on an angle less than 90 degrees relative to a roof of said vehicle;

receiving said signal;

determining a vertical height from said signal and said angle;

comparing said vertical height to said height threshold; and, emitting an audible alarm when said vertical height is less than or equal to said height threshold.

15. The method of claim 14 wherein said step of emitting said signal includes the step of emitting said signal through said windshield.

16. The method of claim 15 further comprising:

coupling an infrared optical sensor to said windshield; and, positioning said infrared optical sensor to emit said signal on said angle to said windshield.

17. The method of claim 16 wherein said angle of said signal is substantially perpendicular to said windshield.

18. The method of claim 16 further comprising:

emitting a visual alarm when said vertical height is less than or equal to said height threshold;

activating a user input device; and, silencing said audible alarm in response to activating said user input device.

19. The method of claim 16 further comprising:

activating a user input device; and, incrementing said height threshold in response to said activating of said user input device.

20. The method of claim 14 further comprising:

emitting a series of signal pulses;

receiving said series of signal pulses wherein said step of determining said vertical height includes the step of averaging at least a portion of said series of signal pulses received by a sensor.

21. An overhead clearance detection system for a vehicle having a windshield comprising:

at least one arm;

a coupler arranged on one end of said at least one arm, said coupler attaching said at least one arm to the inside of said windshield;

a first distance sensor operably coupled to rotate relative to said at least one arm, said first distance sensor having a transmitter for emitting a first signal and a receiver for detecting a reflection of said first signal, said first distance sensor having a first operating range; and, a controller electrically coupled to said first distance sensor, said controller having a processor responsive to executable instructions when executed on said processor for determining vertical distance in response to said receiver detecting said reflection of said first signal.

22. The overhead clearance detection system of claim 21 further comprising:

a second distance sensor operably coupled to said at least one arm, said second sensor emitting a second signal, said second sensor having a second operating range; and an angle sensor disposed between said at least one arm and a housing, said angle sensor being electrically coupled to said controller.

* * * * *